(12) United States Patent
Jung et al.

(10) Patent No.: US 8,554,893 B2
(45) Date of Patent: Oct. 8, 2013

(54) APPARATUS AND METHOD FOR CHANGING SUBSCRIPTION STATUS OF SERVICE IN MOBILE COMMUNICATION SYSTEM AND MOBILE COMMUNICATION SYSTEM THEREOF

(75) Inventors: Bo-Sun Jung, Seongnam-si (KR); Kook-Heui Lee, Yongin-si (KR); Jae-Yeon Song, Seoul (KR); Sung-Oh Hwang, Yongin-si (KR); Byung-Rae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 76 days.

(21) Appl. No.: 12/678,049

(22) PCT Filed: Sep. 5, 2008

(86) PCT No.: PCT/KR2008/005262
§ 371 (c)(1),
(2), (4) Date: Mar. 17, 2010

(87) PCT Pub. No.: WO2009/035236
PCT Pub. Date: Mar. 19, 2009

(65) Prior Publication Data
US 2010/0228844 A1    Sep. 9, 2010

(30) Foreign Application Priority Data

Sep. 14, 2007  (KR) .................. 10-2007-0093765

(51) Int. Cl.
*G06F 15/173*  (2006.01)
*G06F 15/16*  (2006.01)

(52) U.S. Cl.
USPC ............................ 709/223; 709/206; 709/226

(58) Field of Classification Search
USPC ........................................................ 709/223
See application file for complete search history.

(56) References Cited

U.S. PATENT DOCUMENTS

| 5,864,684 A | 1/1999 | Nielsen |
| 6,115,607 A * | 9/2000 | Holcman ................... 455/435.3 |

(Continued)

FOREIGN PATENT DOCUMENTS

| CN | 1294829 | 5/2001 |
| CN | 1897581 | 1/2007 |

(Continued)

OTHER PUBLICATIONS

Great Dictionary of Russian Language, Saint-Petersburg, Publ. "Norint", p. 876, 2000.

(Continued)

*Primary Examiner* — Richard G Keehn
(74) *Attorney, Agent, or Firm* — The Farrell Law Firm, P.C.

(57) ABSTRACT

A method for changing a subscription status of a service in a mobile communication system, and a system thereof. A method is provided for changing a subscription status of a service by a terminal in a mobile communication system. The method includes transmitting a pause request message, in which a pause period of the subscription status is included, to a network entity; receiving, from the network entity, a pause response message including therein a possible pause period for the pause period included in the pause request message, and a trigger for changing validity for a Long-term Key stored in the terminal; and changing validity for the Long-term Key using the trigger for the possible pause period included in the pause response message.

33 Claims, 3 Drawing Sheets

(56) References Cited

U.S. PATENT DOCUMENTS

| | | | |
|---|---|---|---|
| 6,324,587 B1* | 11/2001 | Trenbeath et al. | 719/310 |
| 6,510,515 B1 | 1/2003 | Raith | |
| 8,102,800 B2 | 1/2012 | Lee et al. | |
| 2002/0076050 A1* | 6/2002 | Chen et al. | 380/231 |
| 2002/0136400 A1* | 9/2002 | Askerov et al. | 380/28 |
| 2003/0023980 A1 | 1/2003 | Kikinis et al. | |
| 2003/0225840 A1* | 12/2003 | Glassco et al. | 709/206 |
| 2003/0233413 A1 | 12/2003 | Becker | |
| 2004/0024764 A1* | 2/2004 | Hsu et al. | 707/9 |
| 2006/0085637 A1* | 4/2006 | Pinkas | 713/168 |
| 2006/0168574 A1* | 7/2006 | Giannini et al. | 717/168 |
| 2007/0016674 A1 | 1/2007 | Shinohara et al. | |
| 2007/0056042 A1* | 3/2007 | Qawami et al. | 726/26 |
| 2008/0291853 A1* | 11/2008 | Wiatrowski et al. | 370/310 |
| 2009/0088068 A1 | 4/2009 | Ferrazzini et al. | |

FOREIGN PATENT DOCUMENTS

| | | |
|---|---|---|
| EP | 1 803 234 | 7/2007 |
| JP | 2006-314118 | 11/2006 |
| JP | 2007-511940 | 5/2007 |
| JP | 2008-537862 | 9/2008 |
| KR | 1019990025776 A | 4/1999 |
| KR | 1020050071764 A | 7/2005 |
| KR | 1020070031617 A | 3/2007 |
| WO | WO 01/93587 | 12/2001 |
| WO | WO 2005/048618 | 5/2005 |
| WO | WO 2006/043766 | 4/2006 |
| WO | WO 2006043766 A1 | 4/2006 |
| WO | WO 2007/102147 | 9/2007 |

OTHER PUBLICATIONS

Bell Canada, "Your Simple Steps Guide to Enjoying Bell Express Vu", Wayback Machine Archive, Feb. 5, 2007.

\* cited by examiner

APPARATUS AND METHOD FOR CHANGING SUBSCRIPTION STATUS OF SERVICE IN MOBILE COMMUNICATION SYSTEM AND MOBILE COMMUNICATION SYSTEM THEREOF

BACKGROUND OF THE INVENTION

1. Field of the Invention

The present invention relates generally to a mobile communication system, and in particular, to a method for changing a subscription status of a service in a mobile communication system, and a system thereof.

2. Description of the Related Art

Now, the mobile communication market faces the continuous demand for production of new services through recombination and/or integration of the existing technologies. Today, with the development of communication and broadcasting technologies, the conventional broadcasting system or mobile communication system has reached the phase of providing various services such as broadcast services through a terminal such as mobile phone and Personal Digital Assistant (PDA).

Convergence of mobile communication services and Internet Protocol (IP) technology is now the mainstream in developing the next-generation mobile communication technology due to the market needs, the increasing user demands for multimedia services, the providers' policies to provide new services such as broadcast service in addition to the existing voice services, and the interests of Information Telecommunication (IT) enterprises which are strengthening their mobile communication business in acceptance of the user demands. This has come to introduce and apply various wireless or broadcasting services not only in the mobile communication market but also in the wired communication market, and such omnidirectional convergence has made the same consumption environment for various services regardless of the wire or wireless broadcasting.

Meanwhile, Open Mobile Alliance (OMA), a group of studying the standard for interaction between individual mobile solutions, mainly takes charge of establishing various application standards for mobile games, Internet services, etc. In particular, OMA Mobile Broadcast Working Group (BCAST), one of OMA working groups, is studying the technical standard that provides broadcast services using terminals. OMA BCAST standardizes technology for providing IP-based broadcast services in the portable terminal environment, such as service guide, download and streaming delivery technology, service and content protection technology, service subscription, roaming, etc.

In mobile broadcast, provisioning of subscription/termination, update, purchase/subscription information for the service that the service provider provides, is managed by a service provisioning function block. Regarding service provisioning, OMA BCAST has functions of price information request, service subscription, service termination, encryption key update, token purchase and account information provisioning, and a network entity, called Broadcast Subscription Management (BSM) block, manages and provides information related to the service provisioning.

Along with the market flow of providing integrated services due to the above-stated convergence of wire/wireless environments, the mobile broadcast technology such as OMA BCAST will also evolve into a business model so as to provide services in the wire/wireless integrated environment beyond the mobile environment.

However, in the conventional mobile communication system, only price information and account information requests in addition to subscription, purchase, and update for subscription status are defined for a subscription/purchase-related service in the broadcast service as in the above-stated OMA BCAST. Therefore, when a user, who has subscribed to a service, enjoys the service on a fixed charge basis, or enjoys the service by purchasing a particular content such as movie when needed, the user should always pay a fixed amount of money regardless of whether or not he/she has enjoyed the service for the corresponding period. In addition, when a user leaves the service area for a long period, the user should pay the unnecessary expenses even though he/she cannot physically enjoy the service.

Therefore, there is a need for a scheme capable of changing (pausing a subscription status or resuming the paused subscription status) a subscription status of the user who subscribed to a service in a mobile communication system.

SUMMARY OF THE INVENTION

The present invention provides a method for changing a subscription status of a service in a mobile communication system, and a mobile communication system thereof.

Further, the present invention provides a method for pausing a subscription status of a service in a mobile communication system, and a system thereof.

Further, the present invention provides a method for resuming a paused subscription status of a service in a mobile communication system, and a system thereof.

According to one aspect of the present invention, there is provided a method for changing a subscription status of a service by a terminal in a mobile communication system. The method includes transmitting a pause request message, in which a pause period of the subscription status is included, to a network entity; receiving, from the network entity, a pause response message including therein a possible pause period for the pause period included in the pause request message, and a trigger for changing validity for a Long-term Key stored in the terminal; and changing validity for the Long-term Key using the trigger for the possible pause period included in the pause response message.

According to another aspect of the present invention, there is provided a method for changing a subscription status of a service by a network entity in a mobile communication system. The method includes receiving, from a terminal, a pause request message in which a pause period of the subscription status is included; and transmitting to the terminal a pause response message including therein a possible pause period for the pause period included in the pause request message, and a trigger for changing validity for a Long-term Key stored in the terminal.

According to further another aspect of the present invention, there is provided a mobile communication system for changing a subscription status of a service. The mobile communication system includes a terminal for transmitting a pause request message, in which a pause period of the subscription status is included; receiving a pause response message including therein a possible pause period for the pause period included in the pause request message, and a trigger for changing validity for a Long-term Key stored in the terminal; and changing validity for the Long-term Key using the trigger for the possible pause period included in the pause response message; and a network entity for receiving the pause request message from the terminal, and transmitting the pause response message to the terminal.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Figure 1:
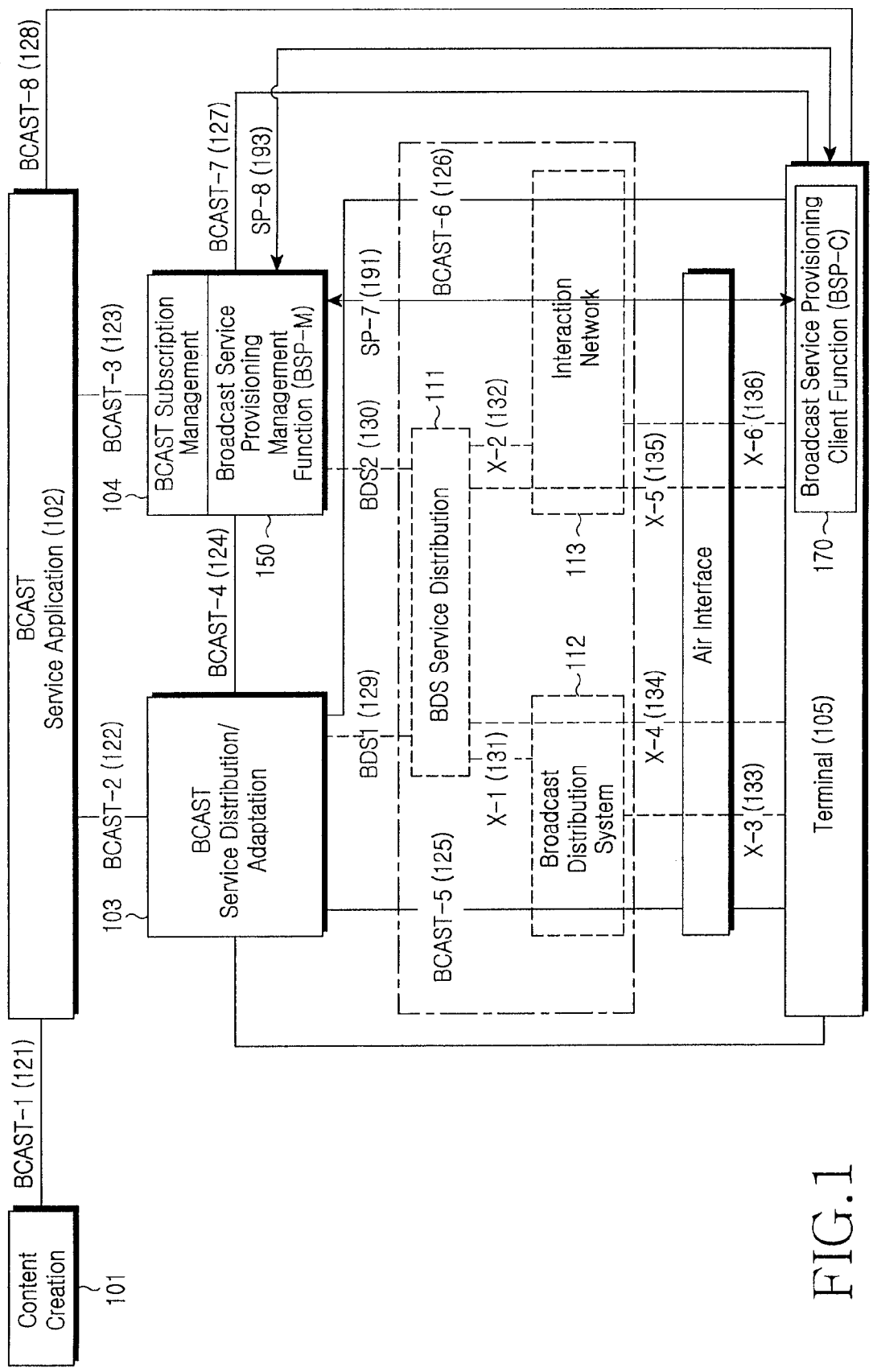
FIG. 1 is a diagram illustrating a logical configuration of OMA BCAST according to an embodiment of the present invention.

Preferred embodiments of the present invention will now be described in detail with reference to the annexed drawings. In the drawings, the same or similar elements are denoted by the same reference numerals even though they are depicted in different drawings. The matters defined in the description such as a detailed construction and elements are provided to assist in a comprehensive understanding of exemplary embodiments of the invention. In the following description, a detailed description of known functions and configurations incorporated herein has been omitted for clarity and conciseness.

In the following description, a typical embodiment of the present invention will be presented. Although a detailed description of the present invention will be given herein using the names of entities defined by $3^{rd}$ Generation Partnership Project (3GPP), which is a standard group for asynchronous mobile communication, or Open Mobile Alliance (OMA) BCAST, which is a standard group for terminal application, to provide a better understanding of the present invention, it is not intended to limit the scope of the present invention to the standards and the names of entities, and the present invention can be applied to any system having similar technical background.

Although a description of the prior art and the present invention will be made herein based on the OMA BCAST technology, one of the mobile broadcast standard technologies, by way of example, it is not intended to limit the scope of the present invention.

FIG. 1 is a diagram illustrating a logical configuration of OMA BCAST according to an embodiment of the present invention.

OMA BCAST defines the standard technologies of up to an application layer and a transport layer for providing broadcast services.

With reference to FIG. 1, a detailed description will now be made of logical entities.

A Content Creation (CC) 101 provides contents which become the basis of BCAST services. The contents can include files for the normal broadcast service, for example, data for movie, audio and video. In addition, the Content Creation 101 provides a BCAST Service Application block 102 with attributes of the contents, used for generating a service guide and determining a transport bearer over which the service is to be delivered.

The BCAST Service Application block 102 is provided with data of BCAST services from the Content Creation 101, and processes the data in the form suitable to provide media encoding, content protection and interactive service. Further, the BCAST Service Application block 102 provides attributes for the contents provided from the Content Creation 101 to a BCAST Service Distribution/Adaptation block 103 and a BCAST Subscription Management block 104.

The BCAST Service Distribution/Adaptation block 103 performs such operations as file/streaming delivery, service gathering, service protection, service guide generation/delivery, and service notification, using the BCAST service data provided from the BCAST Service Application block 102. Further, the BCAST Service Distribution/Adaptation block 103 adjusts the service to be suitable for a Broadcast Distribution System 112.

The BCAST Subscription Management block 104 manages, by hardware or software, service provisioning such as subscription and price-related functions of a BCAST service user, provision of the information used for BCAST services, and a terminal receiving the BAST service.

A Terminal 105 receives program support information such as content/service guide and content protection, and provides the broadcast service to the user.

A Broadcast Distribution System (BDS) Service Distribution block 111 delivers a mobile broadcast service to a plurality of terminals through mutual communication with the Broadcast Distribution System 112 and an Interaction Network 113.

The Broadcast Distribution System 112 delivers the mobile broadcast service over a broadcast channel. The Broadcast Distribution System 112 can include broadcast/communication networks based on Multimedia Broadcast Multicast Service (MBMS) of $3^{rd}$ Generation Project Partnership (3GPP), on Broadcast Multicast Service (BCMCS) of $3^{rd}$ Generation Project Partnership 2 (3GPP2) which is a standard group for $3^{rd}$ generation synchronous mobile communication, on DVB-Handheld (DVB-H) of Digital Video Broadcasting (DVB) which is a digital broadcasting standard group, and on Internet Protocol (IP).

The Interaction Network 113 provides an interaction channel, and the Interaction Network 113 can include a cellular network.

A description will now be made of reference points which are connection paths between the above-stated logical entities.

The reference points have a plurality of interfaces according to their usages. The interfaces are used for communication between two or more logical entities for a specific purpose, and message format and protocol therefor are applied thereto.

BCAST-1 121 is a transmission path for contents and content attributes. BCAST-2 122 is a transmission path for a content-protected or content-unprotected BCAST service, and attributes and content attributes of the BCAST service.

BCAST-3 123 is a transmission path for attributes of a BCAST service, attributes of contents, user preference and subscription information, user request, and response to the request.

BCAST-4 124 is a transmission path for a notification message, attributes used for a service guide, and a key used for content protection and service protection.

BCAST-5 125 is a transmission path for protected BCAST service, unprotected BCAST service, content-protected BCAST service, content-unprotected BCAST service, BCAST service attributes, content attributes, notification, service guide, Digital Right Management (DRM) Right Object (RO) used for BCAST service protection, security material such as key value, and all data and signals transmitted over a broadcast channel.

BCAST-6 126 is a transmission path for protected BCAST service, unprotected BCAST service, content-protected BCAST service, content-unprotected BCAST service, BCAST service attribute, content attributes, notification, service guide, DRM RO used for BCAST service protection, security material such as key value, and all data and signals transmitted over an interaction channel.

BCAST-7 127 is a transmission path for service provisioning, subscription information, device management, DRM RO used for BCAST service protection, and user preference information transmitted over an interaction channel of control information related to reception of security material such as key value.

BCAST-8 128 is a transmission path over which user data for the BCAST service is subject to interaction. BDS-1 129 is a transmission path for protected BCAST service, unprotected BCAST service, BCAST service attribute, content attributes, notification, service guide, DRM RO used for BCAST service protection, and security material such as key value.

BDS-2 130 is a transmission path for service provisioning, subscription information, device management, DRM RO used for BCAST service protection, and security material such as key value.

X-1 131 is a reference point between the BDS Service Distribution block 111 and the Broadcast Distribution System block 112. X-2 132 is a reference point between the BDS Service Distribution block 111 and the Interaction Network 113. X-3 133 is a reference point between the Broadcast Distribution System block 112 and the Terminal 105. X-4 134 is a reference point between the BDS Service Distribution block 111 and the Terminal 105 over a broadcast channel. X-5 135 is a reference point between the BDS Service Distribution block 111 and the Terminal 105 over an interaction channel. X-6 136 is a reference point between the Interaction Network 113 and the Terminal 105.

In FIG. 1, a Broadcast Service Provisioning Management block (BSP-M) 150 included in the BCAST Subscription Management block 104, and a Broadcast Service Provisioning Client Function block (BSP-C) 170 included in the Terminal 105 take charge of user subscription for a BCAST service and purchase for the subscribed service, and provide additional information on payment and purchase such as status information of the user account. Further, the BSP-M 150 and the BSP-C 170 according to an embodiment of the present invention provide information used for changing a subscription status.

A detailed description will now be made of the service provisioning function block. The BSP-M 150 provides subscription information and purchase information. Based on the user subscription information, the BSP-M 150 provides user's account information to an associated entity, and supports accounting for the mobile broadcast service. In addition, the BSP-M 150 receives requests and reports for subscription/accounting and subscription status change from the BSP-C 170 through interfaces of an SP-7 191 and an SP-8 193.

The BSP-C 170 serves to make a report on subscription/purchase and subscription status change for a mobile broadcast service. The BSP-C 170 can extract broadcast service provisioning information from a service guide, and issue a request for the subscription/purchase and subscription status change, or issue a request for additional information.

Table 1 provides a description of the SP-7 191 and the SP-8 193.

TABLE 1

| Interface | Reference Point | Usage |
| --- | --- | --- |
| 191 SP-7 | BCAST-7 | Delivery of messages used for a subscription such as subscription request of user and response from BCAST Subscription Management. Delivery of payment information |
| 193 SP-8 | Out of band | The End User subscribes and purchases the services through the out-of-band interfaces. It's out of scope of OMA BCAST. |

In Table 1, the SP-7 191 is a transmission path for a message for subscription/accounting and subscription status change from the BCAST Subscription Management block 104, and the SP-8 193 is a transmission path for service subscription and purchase through the out-of-band interfaces.

Figure 2:
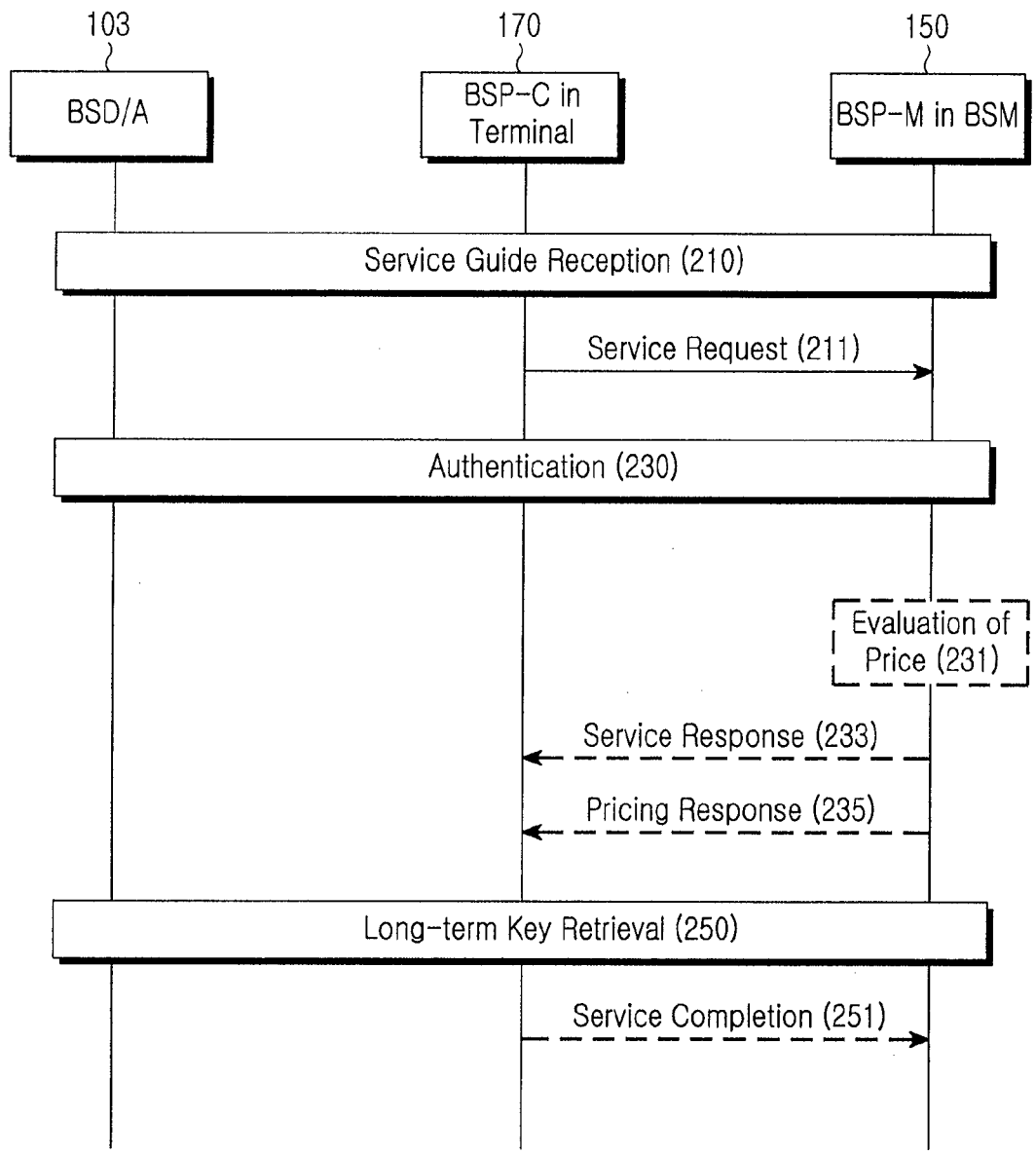
FIG. 2 is a flow diagram illustrating service subscription in a mobile communication system to which the present invention is applied.

FIG. 2 is a flow diagram illustrating service subscription in a mobile communication system to which the present invention is applied.

Referring to FIG. 2, in step 210, for service subscription, a BSP-C 170 receives a service guide from a BCAST Service Distribution/Adaptation block 103, selects a desired subscription or purchase item from the received service guide, and then starts subscription to the service corresponding to the selected item.

In step 211, the BSP-C 170 included in the Terminal 105 sends a Service Request message for subscription to the service to a BSP-M 150 included in a BCAST Subscription Management block 104.

In step 230, the BSP-M 150 performs authentication on the received Service Request message. Thereafter, in step 233, the BSP-M 150 delivers a Service Response message to the BSP-C 170 together with the Service Request message handling and subscription/purchase results, and trigger information by which it is possible to receive a Long-term Key used for decoding of the service. At this point, the BSP-M 150 can evaluate price information included in the Service Request message in step 231, and deliver new price information to the BSP-C 170 using a Pricing Response message in step 235.

In step 250, the BSP-C 170 acquires a Long-term Key through corresponding trigger information included in the received Service Response message, using a method defined in service/content encryption technology in BCAST. In step 251, the BSP-C 170 finally receives the Long-term Key, and then delivers a Service Completion message to the BSP-M 150.

Even the flow of subscription termination, Long-term Key update and token purchase is also similar to the above-stated service subscription flow in the mobile communication system, and is performed between the BSP-C 170 and the BSP-M 150.

Figure 3:
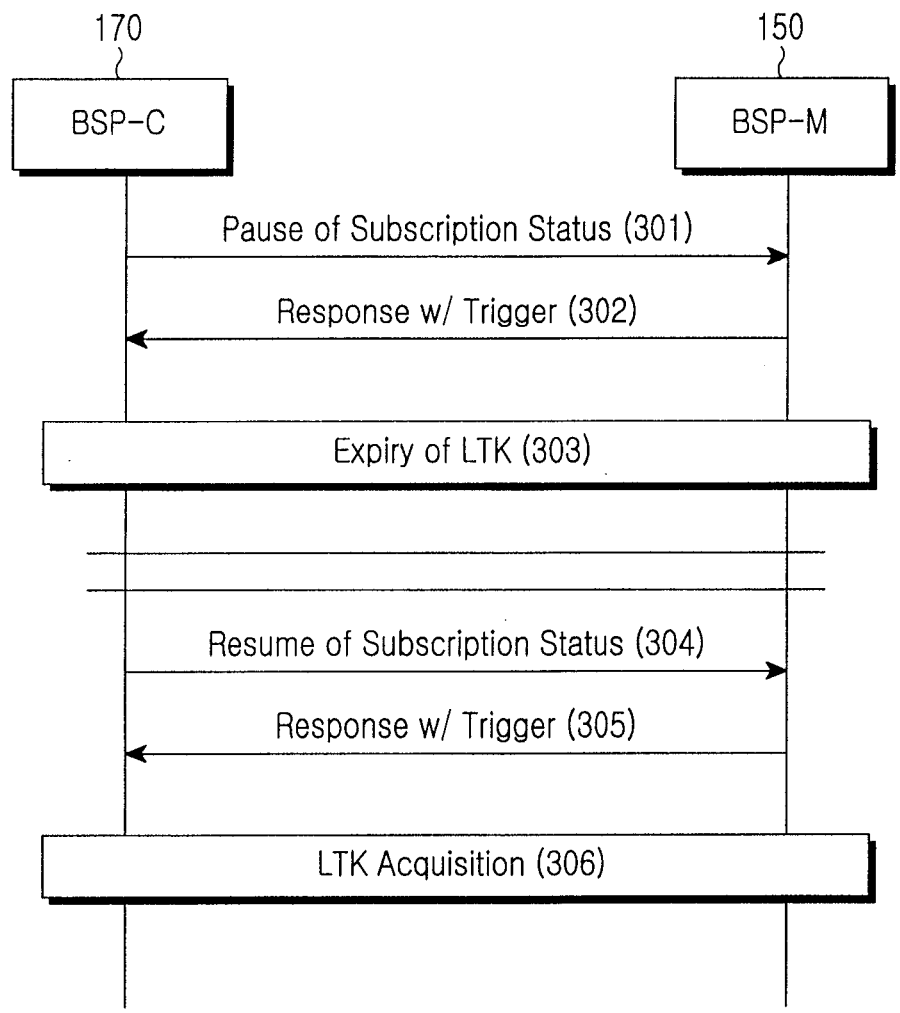
FIG. 3 is a flow diagram illustrating subscription status change according to an embodiment of the present invention.

With reference to FIG. 3, a description will now be made of a method for changing a subscription status (pausing the subscription status and resuming the paused subscription status) after the service subscription according to an embodiment of the present invention.

FIG. 3 is a flow diagram illustrating subscription status change according to an embodiment of the present invention.

Referring to FIG. 3, in step 301, a BSP-C 170 designates a pause period the user requested, such as a period from a service subscription request time to indefiniteness, a particular date from a service subscription request time, a period from a particular date to indefiniteness, a period from a particular date to another particular date, etc, and delivers a Pause Request message of Table 2 to a BSP-M 150. In step 302, the BSP-M 150 handles a pause request for the pause period included in the received Pause Request message, and then delivers a trigger for changing validity for a Long-term Key used for decoding of a service, stored in a Terminal 105, to the BSP-C 170 using a Pause Response message in which a possible pause period is included as shown in Table 3. When the BSP-M 150 cannot approve the pause period included in the Pause Request message, it calculates a possible pause period, and explicitly delivers the possible pause period to the BSP-C 170. Thus, in step 303, the BSP-C 170 changes validity for its current Long-term Key through the trigger in the received Pause Response message. For example, the validity change for a Long-term Key follows a procedure defined in Digital Rights Management (DRM) for BCAST, or in a smartcard capable of storing a large volume of information by attaching an integrated circuit or memory element thereto. Therefore, the Terminal 105 cannot use its Long-term Key for a corresponding period by changing validity of the Long-term Key.

In Table 2 to Table 5 below, 'Name' represents names of elements and attributes constituting a corresponding message. 'Type' indicates whether a type of a corresponding name is an element or an attribute. The elements have such values as E1, E2, E3 and E4, in which E1 means an upper element for the entire message, E2 represents a lower element of E1, E3 represents a lower element of E2, and E4 represents a lower element of E3. The attribute(s) is denoted by 'A', and 'A' indicates an attribute of the corresponding element. For example, 'A' under E1 indicates an attribute of E1.

'Category' is used for determining whether the corresponding element or attribute is mandatory or not, and it has a value M for mandatory element/attribute and a value O for optional one.

'Cardinality' indicates a relationship between elements, and has a value of 0, 0.1, 1, 0 . . . n, 1 . . . n, where '0' means an optional relation, '1' means a mandatory relation, and 'n' means the possibility of having a plurality of values. For example, '0 . . . n' means that the corresponding element may not exist or may have n values.

'Description' indicates the meaning of the corresponding element or attribute, and 'Data Type' indicates a data type for the corresponding element or attribute.

TABLE 2

| Name | Type | Category | Cardinality | Description | Data Type |
| --- | --- | --- | --- | --- | --- |
| SubscriptionPause | E | | | SubscriptionPause Request Message Contains the following attributes: requestID Contains the following elements: UserID DeviceID PurchaseItem | |
| requestID | A | O | 0 . . . 1 | Identifier for the Unsubscribe request message. | unsignedInt |
| UserID | E1 | O | 0 . . . N | The user identity known to the BSM. Contains the following attributes: Type | string |
| type | A | M | 1 | Specifies the type of User ID. Allowed values are: 0 - username defined in [RFC 2865] 1 - IMSI 2 - URI 3 - IMPI 4 - MSISDN 5 - MIN 6-127 reserved for future use 128-255 reserved for proprietary use | unsigned Byte |
| DeviceID | E1 | O | 0 . . . N | A unique device identification known to the BSM. Note: If User has multiple devices, then this element indicates a device or a group of devices that user want to unsubscribe. contains the following attribute: type | string |
| type | A | M | 1 | Specifies the type of Device ID. Allowed values are | unsigned Byte |

TABLE 2-continued

| Name | Type | Category | Cardinality | Description | Data Type |
|---|---|---|---|---|---|
| | | | | 0 - DVB Device ID<br>1 - 3GPP Device ID (IMEI)[3GPP TS 23.003]<br>2 - 3GPP2 Device ID (MEID)[3GPP2 C.S0072]<br>3-127 reserved for future use<br>128-255 reserved for proprietary use | |
| PurchaseItem | E1 | M | 1...N | Specifies identifier of the Purchase Item the user wants to pause subscription status.<br>If every subscribed PurchaseItems are to be requested pause, then only 1 instance of PurchaseItem element should be present and globalIDRef attribute should not be present.<br>If specific subscribed Purchaseitems are requested pause, then one or more instances of PurchaseItem element should be present and globalIDRef will be present for each PurchaseItems.<br>Contains the following attribute:<br>globalIDRef<br>Contains the following element:<br>PausePeriod | |
| globalIDRef | A | O | 0...1 | Identifier of PurchaseItem. GlobalPurchaseItemID found in the PurchaseItem fragment will be used. | anyURI |
| PausePeriod | E2 | M | 1 | Describes the period user wants to pause his/her subscription status from startDate to endDate<br>Contains the following attributes:<br>startDate<br>endDate | |
| startDate | A | M | 0...1 | Indicates start date. If not present, stratDate assumes the day this request message sent and accepted. | dateTime |
| endDate | A | M | 0...1 | Indicates end date. After this date, subscription status is resumed. If not present, endDate assumes no specific day to resume. | dateTime |
| autoResumeAgreement | A | M | 0...1 | Indicates user agreement for automatically resume after the endDate. | Boolean |

According to Table 2, a Pause Request message includes a request Identifier (ID) attribute requestID for pause request, a user ID element UserID for pause, a device ID element DeviceID, and a pause item element PurchaseItem. The pause item element PurchaseItem includes a pause period element Pauseperiod indicating a pause-requested period, in which a start date attribute StartDate and an end date attribute endDate are included. When a user wants to comprehensively pause all items PurchaseItem to which he/she subscribed, the user has only one element 'PurchaseItem' and its lower values in a Subscription Pause message, and does not specify an attribute 'globalIDRef' in the element PurchaseItem. However, if a user wants to pause a particular item PurchaseItem, the user should include an element 'PurchaseItem' in a Subscription Pause message according to a desired pause item PurchaseItem, and should specify an identification value for the corresponding item PurchaseItem in the attribute 'globalIDRef'. Regarding the intended pause period, it is considered that when a start date (StartDate) is specified, a pause request is made from the corresponding date, and when there is no specified date, the pause begins from the date the request is accepted. Similarly, when an end date endDate is specified, the pause is effective until the corresponding date, and after the end date, the paused state is released. If the end date endDate is not specified, the pause is effective until there is a user's request. According to the policy or regulation of the service provider or the nation, when there is a need for user's agreement to automatically release the paused state after the end date, an attribute "autoResumeAgreement" can be included, so that the user can indicate his/her approval.

TABLE 3

| Name | Type | Category | Cardinality | Description | Data Type |
|---|---|---|---|---|---|
| SubscriptionPauseResponse | E | | | Response Message for Subscription Pause Request Contains the following attributes: requestID global StatusCode Contains the following elements: PurchaseItem | |
| requestID | A | O | 0 . . . 1 | Identifier for the corresponding Unsubscribe request message. | unsignedInt |
| globalStatusCode | A | O | 0 . . . 1 | The overall outcome of the request, according to the return codes defined in section 5.11. If this attribute is present and set to value "0", the request was completed successfully. In this case the 'itemwiseStatusCode' SHALL NOT be given per each requested 'PurchaseItem'. If this attribute is present and set to some other value than "0", there was a generic error concerning the entire request. In this case the 'itemwiseStatusCode' SHALL NOT be given per each requested 'PurchaseItem'. If this attribute is not present, there was an error concerning one or more 'PurchaseItem' elements associated with the request. Further, the 'itemwiseStatusCode' SHALL be given per each requested 'PurchaseItem'. | unsigned Byte |
| PurchaseItem | E1 | M | 1 . . . N | The ID of the Purchase Item to which the message is related. Contains the following attribute: globalIDRef itemwiseStatusCode Contains the following element: possiblePeriod | |
| globalIDRef | A | M | 1 | Identifier of PurchaseItem. GlobalPurchaseItemID found in the PurchaseItem fragment will be used. | anyURI |
| itemwiseStatusCode | A | M | 1 | Indicates the results of the SubscriptionPause Request message. If Value is successful, it means relevant PurchaseItem is unsubscribed. GlobalStatusCode specified in section 5.11 will be used for this code. | unsigned Byte |
| Trigger | E2 | M | 0 . . . N | Indicates information terminal can trigger for update Long term key. Note that this is the placeholder to define any information necessary for terminal to trigger. | anyType |
| PossiblePeriod | E2 | M | 0 . . . 1 | Describes the possible period user is able to pause his/her subscription status from startDate to endDate Contains the following | |

TABLE 3-continued

| Name | Type | Category | Cardinality | Description | Data Type |
|---|---|---|---|---|---|
| | | | | attributes:<br>startDate<br>endDate | |
| startDate | A | M | 0 . . . 1 | Indicates start date. If not present, stratDate assumes the day this request message sent and accepted. | dateTime |
| endDate | A | M | 0 . . . 1 | Indicates end date. After this date, subscription status is resumed. If not present, endDate assumes no specific day to resume. | dateTime |

According to Table 3, the Pause Response message includes a request ID attribute requestID, a global status code attribute globalStatusCode, and a pause item element PurchaseItem, for a response to the pause request. The pause item element PurchaseItem includes a trigger element Trigger indicating a trigger, and a possible pause period element PossiblePeriod indicating a possible pause period, in which a start date attribute StartDate and an end date attribute endDate are included.

In step 304 of FIG. 3, when the pause period expires or the user requests service resumption, the BSP-C 170 delivers a Resume Request message of Table 4 to the BSP-M 150 to resume the paused subscription status. In step 305, the BSP-M 150 delivers a trigger for changing validity for a Long-term Key stored in the terminal to the BSP-C 170 using a Resume Response message of Table 5, in which information on the money left in the user account included in the received Resume Request message, and a possible service period available with the corresponding money are included. Thus, in step 306, the BSP-C 170 changes validity for its current Long-term Key through the trigger in the received Resume Response message, and provides the corresponding service.

TABLE 4

| Name | Type | Category | Cardinality | Description | Data Type |
|---|---|---|---|---|---|
| SubscriptionResume | E | | | Subscription Resume Request Message<br>Contains the following attributes:<br>requestID<br>Contains the following elements:<br>UserID<br>DeviceID<br>PurchaseItemID | |
| requestID | A | O | 0 . . . 1 | Identifier for the Subscription long term Key renewal request message. | unsignedInt |
| UserID | E1 | O | 0 . . . N | The user identity known to the BSM. Contains the following attributes:<br>type | string |
| type | A | M | 1 | Specifies the type of User ID. Allowed values are:<br>0 - username defined in [RFC 2865]<br>1 - IMSI<br>2 - URI<br>3 - IMPI<br>4 - MSISDN<br>5 - MIN<br>6-127 reserved for future use<br>128-255 reserved for proprietary use | unsigned Byte |
| DeviceID | E1 | O | 0 . . . N | A unique device identification known to the BSM. This element SHALL be included when the device supports the DRM profile. In this case, the device shall not allow the user to modify the DeviceID<br>Contains the following attributes:<br>type | string |
| type | A | M | 1 | Specifies the type of Device ID. Allowed | unsigned Byte |

TABLE 4-continued

| Name | Type | Category | Cardinality | Description | Data Type |
|---|---|---|---|---|---|
| | | | | values are<br>0 - DVB Device ID<br>1 - 3GPP Device ID<br>(IMEI)[3GPP TS 23.003]<br>2 - 3GPP2 Device ID<br>(MEID)[3GPP2 C.S0072]<br>3-127 reserved for future<br>use<br>128-255 reserved for<br>proprietary use | |
| PurchaseItem | E1 | M | 1 ... N | A list of Purchase Items that the user wants to resume.<br>Contains the following attribute:<br>globalIDRef | |
| globalIDRef | A | M | 1 | GlobalPurchaseItemID to identify this PurchaseItem, found in the PurchaseItem fragment. | anyURI |

According to Table 4, the Resume Request message includes a request ID attribute reauestID for resume request, and a user ID element UserID, a device ID element DeviceID and a pause item ID element PurchaseItemID, for resumption.

TABLE 5

| Name | Type | Category | Cardinality | Description | Data Type |
|---|---|---|---|---|---|
| SUBX_SCRIPTIONRESUMERESPONSE | E | | | Response Message for subscription resume.<br>Contains the following attributes:<br>requestID<br>globalStatusCode<br>Contains the following elements:<br>PurchaseItem | |
| requestID | A | O | 0 ... 1 | Identifier for the corresponding SubscriptionResume request message. | unsignedInt |
| globalStatusCode | A | O | 0 ... 1 | The overall outcome of the request, according to the return codes defined in section 5.11.<br>If this attribute is present and set to value "0", the request was completed successfully. In this case the 'itemwiseStatusCode' SHALL NOT be given per each requested 'PurchaseItem'.<br>If this attribute is present and set to some other value than "0", there was a generic error concerning the entire request. In this case the 'itemwiseStatusCode' SHALL NOT be given per each requested 'PurchaseItem'.<br>If this attribute is not present, there was an error concerning one or more 'PurchaseItem' elements associated with the request. Further, the 'itemwiseStatusCode' SHALL be given per each requested 'PurchaseItem'. | unsigned Byte |

TABLE 5-continued

| Name | Type | Category | Cardinality | Description | Data Type |
|---|---|---|---|---|---|
| PurchaseItem | E1 | M | 1 ... N | Describes the results of the request message of Subscription Resume. If resume is successful, LTKValidityEndTime of PurchaseItem will be present. If not, ItemWiseStatusCode will be present to show user the reason why the request is not accepted by BSM. Contains the following attributes: globalIDRef ltkValidityEndTime itemwiseStatusCode Contains the following sub-element: AccountInfo Trigger | |
| globalIDRef | A | M | 1 | The ID of the Purchase Item to which the validity end time is related. A purchase item is identified by the GlobalPurchaseItemID found in the PurchaseItem fragment. | anyURI |
| ltkValidityEndTime | A | O | 0 ... 1 | The last time and date of validity of the Long-Term Key Message, after which it has to be renewed again. This attribute will be present when BSM accept the request message. This field is expressed as the first 32 bits integer part of NTP time stamps. Note: the information on this element can be provided in RO. | unsignedInt |
| itemwiseStatusCode | A | O | 0 ... 1 | Specifies a status code of each PurchaseItems using GlobalStatusCode defined in the section 5.11. | unsigned Byte |
| PurchaseDataReference | E2 | M | 1 | Describes period user can consume this PurchaseItem with the remaining money in user's account. Contains the following sub-element: Price PossiblePeriod | |
| Money | E3 | O | 0 ... N | The remaining money currently, possibly in multiple currencies. Contains the following attribute: currency | double |
| currency | A | O | 0 ... 1 | Specifies the currency codes defined in ISO 4217 international currency codes. If not given, value of price is amount of Tokens. | string |
| PossiblePeriod | E2 | M | 0 ... 1 | Describes the possible period after resuming subscription status Contains the following attributes: startDate endDate | |
| startDate | A | M | 0 ... 1 | Indicates start date. If not present, stratDate assumes the day this request message sent and accepted. | dateTime |
| endDate | A | M | 0 ... 1 | Indicates end date. After this date, subscription status is resumed. If not present, endDate assumes no specific | dateTime |

TABLE 5-continued

| Name | Type | Category | Cardinality | Description | Data Type |
|---|---|---|---|---|---|
| Trigger | E2 | M | 0 ... N | day to resume. Indicates information terminal can trigger for update Long term key. Note that this is the placeholder to define any information necessary for terminal to trigger. | anyType |

According to Table 5, the Resume Response message includes a request ID attribute requestID, a global status code attribute globalStatusCode, and a pause-requested purchase item element PurchaseItem, for a response to the resume request. In addition, the pause-requested purchase item element PurchaseItem includes a pause data reference element PurchaseDataReference, a possible service period element PossiblePeriod, and a trigger element Trigger indicating a trigger, and the pause data reference element PurchaseDataReference includes an element for information on the money left in the user account.

As is apparent from the foregoing description, the present invention allows a user, who subscribed to the fixed charge system, to pause the subscription status in the situation where he/she cannot receive the service for a long term, thus making it possible to prevent unnecessary payment by making the payment based on the real use of the service. As a result, the service provider can provide various accounting models in the charge system.

In addition, according to the present invention, when a user pauses the subscription status, the user can use the money left at the paused time from the time he/she resumes the service, so the user can flexibly use given money.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for changing a subscription status of a service by a terminal in a broadcasting system, the method comprising:
transmitting, to a network entity, a pause request message including purchase item information that indicates at least one purchase item that a user wants to pause a subscription status of;
receiving, from the network entity, a pause response message to the pause request message, the pause response message including a possible period when the user is able to pause the subscription status, and a trigger for the possible period indicating that the terminal can trigger for update of a Long-term Key; and
changing the subscription status by changing validity for the Long-term Key using the trigger for the possible period.

2. The method of claim 1, wherein the pause period information includes at least one of a pause start date and a pause end date.

3. The method of claim 1, wherein the pause response message includes information on a maximum pause period allowable by the network entity if a pause period requested by the terminal exceeds a pause period allowed by the network entity.

4. The method of claim 1, further comprising:
transmitting, to the network entity, a SubscriptionResume request message for service resumption on the at least one purchase item, when the subscription status has changed;
receiving a resume response message to the SubscriptionResume request message from the network entity, the resume response message including money information that indicates a remaining balance, a remaining period that indicates a period that the user can consume, after resuming a subscription period, and a trigger indicating that the terminal can trigger for an update of the Long-term Key; and
changing a subscription status of the at least one purchase item by changing validity for the Long-term Key using the trigger for the remaining period.

5. The method of claim 4, wherein the SubscriptionResume request message is transmitted when the possible period expires, or when a service resume request for the at least one purchase item is input by a user.

6. The method of claim 1, wherein the changing step comprises deleting the Long-Term key.

7. The method of claim 1, wherein the purchase item information includes pause period information that indicates a pause period that the user wants to pause the subscription status, and globalIDRef information that indicates an identifier of the at least one purchase.

8. The method of claim 7, wherein the pause period is a period for which a particular item among all purchase items is paused, and the globalIDRef information includes an identifier of the particular item.

9. The method of claim 1, wherein the pause period is a period for which all purchase items are paused.

10. A method for changing a subscription status of a service by a network entity in a broadcasting system, the method comprising:
receiving, from a terminal, a pause request message including purchase item information that indicates at least one purchase item that a user wants to pause a subscription status of; and
transmitting, to the terminal, a pause response message to the pause request message,
wherein the muse response message includes a possible period when the user is able to pause the subscription status, and a trigger for the possible period indicating that the terminal can trigger for an update of a Long-term Key, and
wherein the trigger for the possible period is used for changing validity for the Long-term Key.

11. The method of claim 10, wherein the pause period information includes at least one of a pause start date and a pause end date.

12. The method of claim 10, wherein the pause response message includes information on a maximum pause period allowable by the network entity if a pause period requested by the terminal exceeds a pause period allowed by the network entity.

13. The method of claim 10, further comprising:
receiving, from the terminal, a SubscriptionResume request message for service resumption on the at least one purchase item, when the subscription status has changed; and
transmitting, to the terminal, a resume response message to the SubscriptionResume request message.

14. The method of claim 10, wherein the purchase item information includes pause period information that indicates a pause period that the user wants to pause the subscription status, and globalIDRef information that indicates an identifier of the at least one purchase item.

15. The method of claim 14, wherein the pause period is a period for which a particular item among all purchase items is paused, and the globalIDRef information includes an identifier of the particular item.

16. A terminal for changing a subscription status of a service in a broadcasting system, the terminal comprising:
a transmitter for transmitting to a network entity a pause request message including purchase item information indicating at least one purchase item that a user wants to pause a subscription status of;
a receiver for receiving, from the network entity, a pause response message to the pause request message, the pause response message including a possible period when the user is able to pause the subscription status, and a trigger for the possible period indicating that the terminal can trigger for an update of a Long-term Key; and
a controller for changing the subscription status by changing validity for the Long-term Key using the trigger for the possible period.

17. The terminal of claim 16, wherein the pause period information includes at least one of a pause start date and a pause end date.

18. The terminal of claim 16, wherein the pause response message includes information on a maximum pause period allowable by the network entity if a pause period requested by the terminal exceeds a pause period allowed by the network entity.

19. The terminal of claim 16, wherein transmitter transmits to the network entity a SubscriptionResume request message for service resumption on the at least one purchase item, when the subscription status has changed.

20. The terminal of claim 19, wherein the SubscriptionResume request message is transmitted when the possible pause period expires, or when a service resume request for the at least one purchase item is input by a user.

21. The terminal of claim 19, wherein the receiver receives a resume response message to the SubscriptionResume request message from the network entity, and
wherein the resume response message includes money information indicating a remaining balance, a remaining period indicating a period that user can consume after resuming a subscription period, and a trigger indicating that the terminal can trigger for an update of the Long-term Key.

22. The terminal of claim 21, wherein the controller changes a subscription status of the at least one purchase item by changing validity for the Long-term Key using the trigger for the remaining period.

23. The terminal of claim 16, wherein the controller deletes the Long-Term key.

24. The terminal of claim 16, wherein the purchase item information includes pause period information that indicates a pause period that the user wants to pause the subscription status, and globalIDRef information that indicates an identifier of the at least one purchase item.

25. The terminal of claim 24, wherein the pause period is a period for which a particular item among all purchase items is paused, and the globalIDRef information includes an identifier of the particular item.

26. The terminal of claim 16, wherein the pause period is a period for which all purchase items are paused.

27. A network entity for changing a subscription status of a service in a broadcasting system, the network entity comprising:
a receiver for receiving, from a terminal, a pause request message including purchase item information that indicates at least one purchase item that a user wants to pause a subscription status of; and
a transmitter for transmitting, to the terminal, a pause response message to the pause request message,
wherein the pause response message includes a possible period when the user is able to pause the subscription status, and a trigger for the possible period indicating that the terminal can trigger for an update of a Long-term Key, and
wherein the trigger for the possible period is used for changing validity for the Long-term Key.

28. The network entity of claim 27, wherein the pause period information includes at least one of a pause start date and a pause end date.

29. The network entity of claim 27, wherein the pause response message includes information on a maximum pause period allowable by the network entity if a pause period requested by the terminal exceeds a pause period allowed by the network entity.

30. The network entity of claim 27, the receiver receives from the terminal a SubscriptionResume request message for service resumption on the at least one purchase item, when the subscription status has changed.

31. The network entity of claim 30, wherein the transmitter transmits a resume response message to the SubscriptionResume request message to the terminal, the resume response message including money information indicating a remaining balance, a remaining period indicating a period that user can consume after resuming a subscription period, and a trigger indicating that the terminal can trigger for an update of the Long-term Key, and
wherein the trigger included in the resume response message is used for changing validity for the Long-term Key for the remaining period.

32. The network entity of claim 27, wherein the purchase item information includes pause period information that indicates a pause period that the user wants to pause the subscription status, and globalIDRef information that indicates an identifier of the at least one purchase item.

33. The network entity of claim 32, wherein the pause period is a period for which a particular item among all purchase items is paused, and the globalIDRef information includes an identifier of the particular item.

* * * * *